(No Model.)
J. SWAN.
FERRULE FOR TOOL HANDLES.
No. 589,043. Patented Aug. 31, 1897.
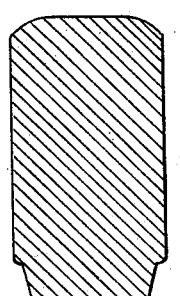
Fig. 1.
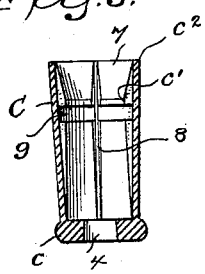
Fig. 3.
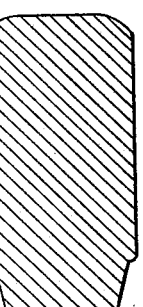
Fig. 2.
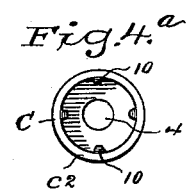
Fig. 4.
Fig. 4a.
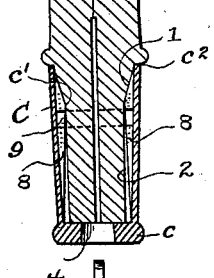
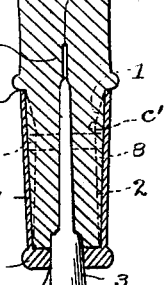
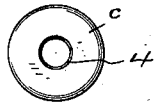
Fig. 6.
Fig. 7.
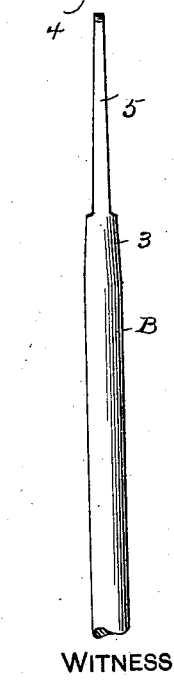
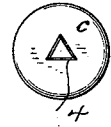
Fig. 8.
Fig. 5.
Fig. 9.
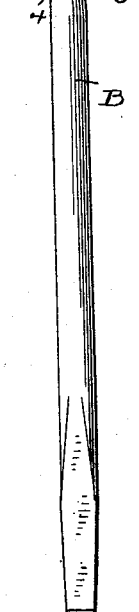
WITNESSES
H. A. Lamb.
S. V. Heley
INVENTOR
James Swan
By A. M. Wooster
Atty.

UNITED STATES PATENT OFFICE.

JAMES SWAN, OF SEYMOUR, CONNECTICUT.

FERRULE FOR TOOL-HANDLES.

SPECIFICATION forming part of Letters Patent No. 589,043, dated August 31, 1897.

Application filed April 22, 1897. Serial No. 633,314. (No model.)

*To all whom it may concern:*

Be it known that I, JAMES SWAN, a citizen of the United States, residing at Seymour, in the county of New Haven and State of Connecticut, have invented certain new and useful Improvements in Ferrules for Tool-Handles; and I do hereby declare the following to be a full, clear, and exact description of the invention, such as will enable others skilled in the art to which it appertains to make and use the same.

My invention has for its object to provide a ferrule for tool-handles which shall be simple and inexpensive to produce and which shall be so constructed that when driven to place upon a handle it shall be locked there by the insertion of the tool in such a manner that it will be practically impossible for the ferrule to turn on or to be removed from the handle, or for the tool to turn in or be separated from the handle and ferrule.

With these ends in view I have devised the novel ferrule of which the following description, in connection with the accompanying drawings, is a specification, numbers and letters being used to designate the several parts.

Figure 1 is a section of a tool-handle, showing my novel ferrule thereon and the shank of the tool, in the present instance a screw-driver, separated therefrom, the tapering portion of the tool-shank being round in cross-section; Fig. 2, a similar view showing the shank of the tool as driven to place in the ferrule; Fig. 3, a longitudinal section of a ferrule detached; Fig. 4, a plan view of the ferrule detached as seen from the top in Fig. 3; Fig. $4^a$, a view similar to Fig. 4, but showing longitudinal ribs instead of longitudinal grooves on the inner periphery of the ferrule; Fig. 5, a view of a tool, in the present instance a screw-driver, the tapering portion of the shank being angular in cross-section; and Figs. 6, 7, 8, and 9 are inverted plan views of ferrules detached, showing openings of different shapes to receive differently-shaped tool-shanks.

A denotes the handle, which may be of any ordinary or preferred design, and is provided with a longitudinal opening 6 to receive the tang 5 of a tool. The end of the handle opposite to the gripping portion is provided with a straight portion 2, and may also be provided with a tapering portion 1, both of which are covered by the ferrule C.

B denotes the shank of a tool, in the present instance a screw-driver, which is tapered, as at 3, to correspond with a taper-opening 4 in the head $c$ of the ferrule, presently to be described. This tapering portion of the shank may be made in any preferred shape in cross-section, the opening in the head of the ferrule being, of course, shaped to correspond therewith, (see Figs. 6 to 9, inclusive,) in which I have shown ferrules provided with differently-shaped taper-openings 4 to receive correspondingly-shaped tapering portions of a tool-shank. The tang 5, which engages the handle, is ordinarily flattened on opposite sides, the sides and edges of the handle being ordinarily tapered toward the end of the tang, as shown in Figs. 1 and 5. The ferrule is provided with the usual opening 7, which receives portions 1 and 2 of the handle.

The essential feature of my novel ferrule is that from the inner side of the head $c$ the diameter tapers, the taper terminating in a shoulder $c'$, at which point the internal diameter of the opening is the smallest. From shoulder $c'$ I have shown the internal diameter as tapering outward to the base $c^2$ to correspond with taper 1 of the handle.

The taper of the ferrule from the head $c$ to the shoulder corresponds substantially with the taper of the ordinary tang 5 of the tool when the latter is driven into the handle, for the purpose presently described.

8 denotes longitudinal grooves in the inner periphery of the ferrule, into which the wood of the handle is forced to prevent the ferrule from turning on the handle, and 9 denotes a circumferential groove, one or more of which may be formed in the inner periphery of the ferrule. These circumferential grooves make the ferrule lighter without reducing the strength and also form an additional hold upon the wood of the handle.

The operation and use of my novel ferrule will be readily understood from Figs. 1 and 2, in connection with Fig. 3. The outward tapering portion of the socket from the shoulder $c'$ to the end $c^2$ enables the end of the handle to be inserted into the socket without being obstructed or splintered by contact with the lower side of the groove 9. In other words, said outward tapering portion forms a guide for facilitating the fitting of the socket and handle together without splintering the latter. Said parts being thus united, the tang of the tool is driven into opening 6 in the handle until taper 3 of the tool-shank engages taper-opening 4 in the ferrule. As the tang is larger than the opening in the handle it follows inevitably that the driving of the tang into the handle must compress the wood of the handle outward, forcing it into the longitudinal grooves 8 and into the circular groove or grooves, and especially forcing the wood into the enlarged portion of opening 7, between shoulder $c'$ and the inner side of head $c$, thereby making it practically impossible to turn the ferrule upon the handle or to remove the ferrule from the handle, and, furthermore, making it practically impossible to remove the tool, owing to the fact that taper 3 of the shank will engage taper-opening 4 in the ferrule with a drive-fit.

Owing to the internal taper of the ferrule from the head $c$ to the shoulder being substantially parallel with the taper of the tang 5 of the tool, the driving of the latter into the opening 6 of the handle forces the wood of the handle equally into the grooves 8 throughout their length, thereby increasing the hold or grip of the parts against relative rotary movement over a construction of socket having straight walls, or walls tapering in a direction the reverse of the taper of the tang.

If preferred, longitudinal ribs 10 (see Fig. 4ª) may be formed upon the inner periphery of the ferrule instead of longitudinal grooves 8, the effect in either instance being to prevent the ferrule from turning on the handle.

Having thus described my invention, I claim—

1. A ferrule for tool-handles having the internal shoulder $c'$, and head $c$, the walls between said shoulder and head having longitudinal grooves and being tapered to substantially correspond with the taper of the ordinary tang of a tool.

2. A ferrule for tool-handles having the internal shoulder $c'$ and head $c$, the walls between said shoulder and head having longitudinal grooves and being tapered to substantially correspond with the taper of the ordinary tang of a tool, said ferrule having also the circumferential groove 9 and being outwardly tapered above the upper wall of said groove.

In testimony whereof I affix my signature in presence of two witnesses.

JAMES SWAN.

Witnesses:
W. DOOLITTLE,
K. N. SMITH.